March 21, 1944. R. C. GUNNESS 2,344,770
CATALYST REGENERATION CONTROL
Filed Dec. 15, 1941 2 Sheets-Sheet 1

Patented Mar. 21, 1944

2,344,770

UNITED STATES PATENT OFFICE 2,344,770

CATALYST REGENERATION CONTROL

Robert C. Gunness, Chicago, Ill., assignor to Standard Oil Company, Chicago, Ill., a corporation of Indiana Application December 15, 1941, Serial No. 422,987

4 Claims. (Cl. 252—242)

This invention relates to an improved method for regenerating catalyst material and it pertains more particularly to the regeneration of a bed of solid catalyst particles which particles have become coated with carbonaceous deposits.

The invention will be described as applied to the regeneration of a hydroforming or dehydroaromatization catalyst consisting essentially of alumina with a small amount of molybdenum oxide deposited thereon. The invention is equally applicable to the regeneration of other hydroforming catalysts, particularly those containing oxides of molybdenum, chromium, tungsten, vanadium, cerium, etc., on activated alumina, active alumina gel, acid treated bauxite or equivalent material.

The invention is not limited to the regeneration of hydroforming catalysts but may also be applied to the regeneration of catalysts for cracking, reforming, gas reversion, polymerization, isomerization, dehydrogenation—i. e., any solid catalyst that has become deactivated because of carbonaceous deposits. The invention is also applicable to the regeneration of contacting clay employed for the treating of mineral oils and, in fact, for the regeneration of any non-combustible matter which must be freed from combustible deposits without exceeding a desired regeneration temperature.

The invention is particularly applicable to the regeneration of such catalysts or contact material in relatively large beds. When the catalyst in such beds becomes coated with carbonaceous materials, it is first purged with an inert gas to remove volatile combustible matter. The deposits are then burned from the contact material by means of an oxygen-containing gas. The burning takes place primarily in a relatively narrow zone or band which travels through the catalyst bed at a rate dependent upon operating conditions and the nature and quantity of the carbonaceous deposits. The progress of this flame front can be easily traced through the bed since the temperature at a given level in the bed breaks sharply as the burning zone passes that level. An object of my invention is to obtain a very sharp temperature break at each level in the bed as the flame front passes said level since it has been found that the sharpness of this temperature break is an index of the effectiveness of said regeneration.

Although the progression of burning through the upper half of the bed (when the regeneration gas is introduced from the top) appears to be quite regular, horizontal temperature studies have shown that burning takes place with increasing irregularity as the bottom of the bed is approached. In other words, there is a distinct time lag between temperature peaks at different points on the same cross-sectional level. This may be due in part to channelling or it may be due in part to pockets or local areas of increased carbonaceous deposits. Such a pocket of increased carbonaceous deposit might well occur between adjacent thermocouples and at such distances therefrom as to produce serious overheating of the catalyst without effecting thermocouple readings. An object of my invention is to provide a method for avoiding such hot spots in the catalyst bed during regeneration.

It is, of course, desirable to have thermocouples spaced at intervals throughout the entire catalyst bed and to regulate the oxygen content of the entering regeneration gas so as to prevent any temperature from exceeding the desired maximum which in this case may be about 1000 or 1050° F. While such methods of temperature control are necessary, they are not adequate for obtaining optimum regeneration. In the first place, there is considerable lag between the time of observing increased temperatures and the time at which the diminished oxygen concentration is actually effected in the catalyst bed. In the second place, any sharp break in the oxygen concentration leads to an insufficient combustion at that particular level of the flame front which, in turn, makes it necessary that that particular portion of the catalyst be regenerated by a secondary burning. Secondary burning, i. e., a burning which is effected after the flame front has passed through the bed, is not as effective as adequate primary burning. Secondary burning makes the regeneration operation take an excessive amount of time, and it still further aggravates the problem of hot spots because of the high oxygen concentration which is employed in secondary combustion. An object of my invention is to avoid the necessity of any sharp changes in the oxygen content of entering regeneration gases and at the same time to employ the maximum oxygen concentration that can be safely employed for effecting primary combustion. A further object is to avoid or minimize the necessity of any secondary combustion and to avoid any danger of hot spots during secondary combustion where secondary combustion is required. A further object is to avoid sharp fluctuations in air input. Other objects will be apparent as the detailed description of my invention proceeds.

The temperature at any point in the catalyst bed is dependent upon a large number of variables among which are: (1) the amount and temperature of entering regeneration gas, (2) the oxygen concentration in the regeneration gas, (3) the nature and concentration of carbonaceous deposits to be burned. While the carbonaceous deposits may be fairly uniform throughout the bed such deposits are usually slightly higher at the top (assuming a downflow reactor) than at the bottom.

With large catalyst deposits, i e., upwards of 1 or 2 pounds of carbonaceous matter per cubic foot of catalyst bed, relatively high air concentrations can be used because the flame front moves relatively slowly and channelling or "finger" burning is less prominent. In this case the preheating of the regeneration gases by that portion of the bed which has already been regenerated is of less significance than the preheating of the regeneration gases in the case of light carbonaceous deposits and the more rapidly moving flame front. The effect of the amount of carbonaceous deposit on catalyst bed temperature increases with various percents of oxygen in the entering regeneration gas. Since the deposits usually amount to at least 1 pound per cubic foot, the maximum temperature reached in the catalyst bed can be quite closely controlled by proper regulation of the oxygen content and entering temperature of a given amount of regeneration gas.

In practicing my invention I regulate the oxygen concentration in the entering regeneration gases in accordance with the inlet temperature of said gas while recycling a large and substantially constant amount of flue gas. It would be possible to analyze the recycled flue gas and to determine from such analysis and from the recycled flue gas temperature just how much air should be reintroduced but this would involve a certain time lag and would be a rather involved and laborious procedure. In accordance with my invention I continuously withdraw a small sample of the inlet regeneration gas and introduce it together with a slight excess of hot fuel gas through an insulated catalytic combustion zone which is provided with a thermocouple or other indicating means for registering the highest temperature that will be produced by the complete combustion supportable by the oxygen contained in the inlet regeneration gas. If this maximum temperature is higher than that desired in the regeneration chamber I gradually diminish the amount of air which is introduced into the recycle gas stream. If the indicated temperature is appreciably lower than the desired regeneration temperature I gradually increase the amount of introduced air. The thermocouple or heat indicating means may in fact automatically control the valve for admitting air or other oxygen-containing gas into the flue gas stream. By this simple expedient I keep the oxygen concentration of the regeneration gases at an optimum value throughout the regeneration cycle and I avoid the time lag which would necessarily result if the oxygen concentration were varied solely in accordance with actual catalyst bed temperatures. As a result, I can effect the regeneration much more rapidly and more smoothly, I can obtain more effective and more complete regeneration and, at the same time, I can obtain a closer and safer temperature control than is possible by methods heretofore employed.

The invention will be more fully understood from the following detailed description read in conjunction with the accompanying drawings which form a part of the specification and in which:

Figure 3 is a detailed schematic section illustrating the mounting of my oxygen concentration control device within a recycle gas line.

Figure 1:
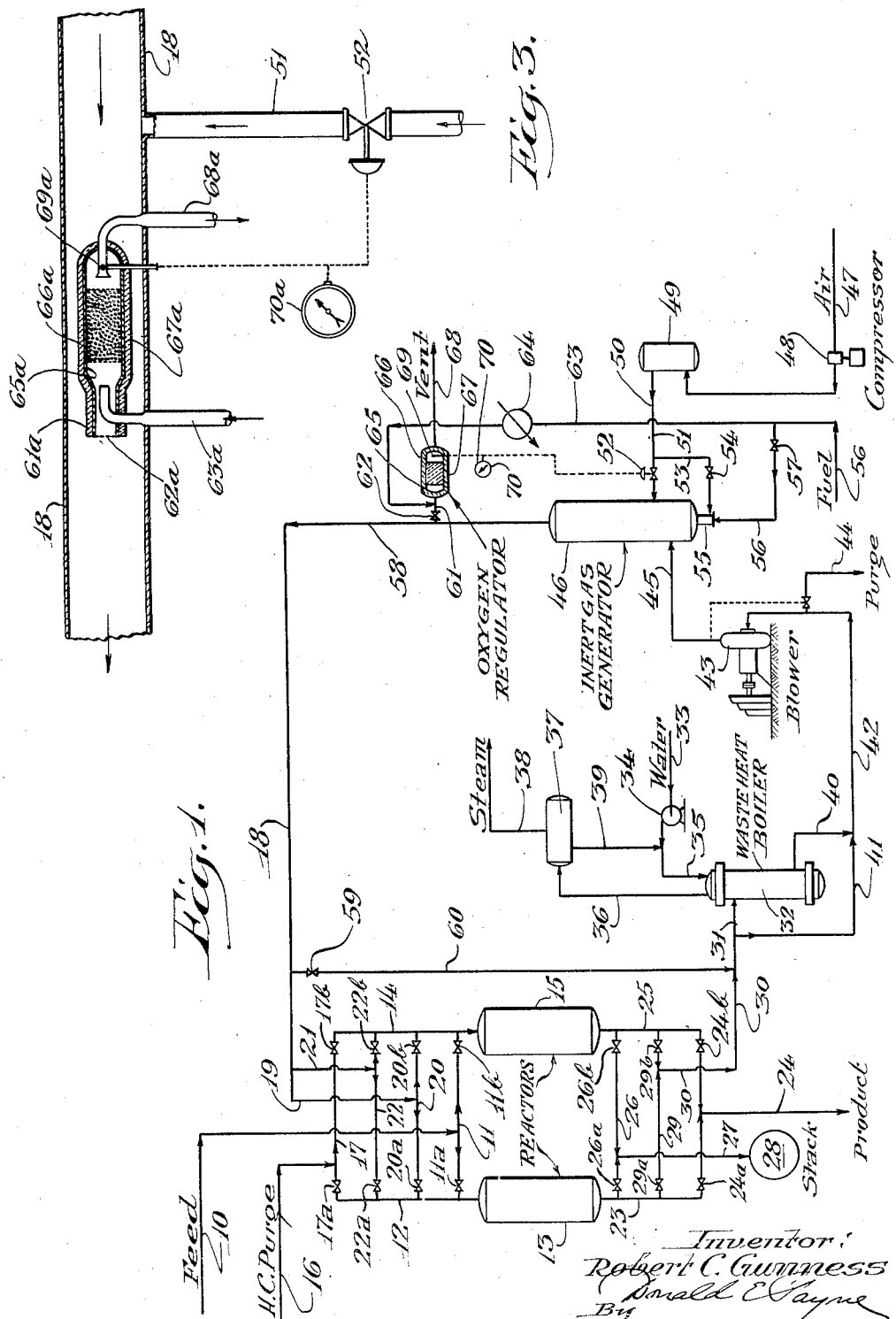
Figure 1 is a diagrammatic flow sheet of my improved regeneration system.

Before describing the application of my invention to a regeneration system I will first describe a particular regeneration system of the type employed in the process for hydroforming or dehydroaromatizing naphthas. Vaporized naphtha feed together with hydrogen or recycled hydrocarbon gas from line 10 may pass through line 11 and valve 11A and line 12 to reactor 13 or through valve 11B and line 14 to reactor 15. Purge gas from line 16 may pass through line 17, valve 17A and line 12 to reactor 13 or through valve 17B and line 14 to reactor 15. Recycled flue gas (or inlet regeneration gas) from line 18 may be introduced for pressuring purposes through line 19, line 20, valve 20A and line 12 to reactor 13 or through valve 20B and line 14 to reactor 15. Regeneration gases may be introduced through line 21, line 22, valve 22A and line 12 into reactor 13 or through valve 22B and line 14 into reactor 15.

Products from reactor 13 may be withdrawn through line 23, valve 24A and line 24 to a suitable fractionation system. Similarly, products from reactor 15 may be withdrawn through line 25, valve 24B and line 24 to the fractionation system. Gases may be withdrawn from reactor 13 through line 23, valve 26A, line 26 and line 27 to stack 28; similarly, gases from reactor 15 may be withdrawn through line 25, valve 26B, line 26 and line 27 to said stack. Exit regeneration gases may be withdrawn from reactor 13 through line 23, valve 29A, line 29 and line 30; similarly, exit regeneration gases from reactor 15 may be withdrawn through line 25, valve 29B, line 29 and line 30.

The exit regeneration gases may be passed from line 30, through line 31 to waste heat boiler 32. Water from line 33 may be pumped by pump 34 through line 35, through suitable tubes in this waste heat boiler and the steam generated in this boiler may be passed by line 36 to separator 37, the steam leaving the top of this separator through line 38 and the water being returned from the top of separator through line 39 for recycling through the waste heat boiler.

Regeneration gases leaving the waste heat boiler through line 40 or short circuiting the waste heat boiler through line 41 are passed by line 42 to flue gas circulator or blower 43, a part of the flue gases, however, being purged from the system through line 44. A blower 43 discharges through line 45 into inert gas generator or mixing chamber 46.

Air from line 47 is compressed by compressor 48 and introduced into surge drum 49 by which it is passed through line 50, line 51 and valve 52 to mixer 46. A part of the air is introduced through line 53 in amounts regulated by valve 54 into a burner 55 which discharges combustion products into the mixer 46 and which is supplied with fuel through line 56 in amounts regulated by valve 57. Gas from mixer 46 passes through line 58 and line 18 for recycling through one of the reactors or it may be by-passed through the waste heat boiler by opening valve 59 in line 60.

The operation of the regeneration system thus far described may be as follows:

With reactor 13 at the end of its on-stream period and reactor 15 ready to begin its on-stream period, valves 24B and 11B are opened and valve 11A is closed, thus leaving reactor 13 at a pressure of about 300 pounds per square inch and at a temperature of about 900° F. Valve 17A is then opened and there is an 8 minute gas purge. Then valve 17A is closed, valve 24A is closed and valve 26A is opened for depressuring the reaction chamber to the blow-down tank or stack 28. This depressuring may require about 5 minutes.

Next valve 20A is opened to permit a 4 minute low pressure purge after which valve 26A is closed and the reaction chamber is brought back to a pressure of 100 pounds or more per square inch. At this point valves 22A and 29A are opened to permit circulation of regeneration gas through the chamber, valve 59 is closed in by-pass line 60 and valve 52 is opened to introduce air into the recycled regeneration gas stream, valves 54 and 57 and 20A being closed. The regeneration proceeds for a period of about 4 or 5 hours and during most of this time the oxygen concentration in the regeneration gases entering chamber 13 is about 1 to 2%. At the end of this regeneration step valves 54 and 57 are opened for reheating the recycled gas stream and bringing the catalyst bed back up to reaction temperature, valve 52 being closed at this time. After about ½ hour reheating period, valve 59 is opened and valves 22A and 29A are closed. Valve 26A is then opened and the catalyst chamber is depressured for about 2 minutes. After the depressuring step valve 26A is closed and valve 17A is opened for repressuring the chamber to about 300 pounds per square inch after which valve 17A is again closed, valve 24A is again opened and feed vapors are again introduced into the chamber by opening valve 11A. The regeneration of reactor 15 then proceeds in the same way with the B valves taking the place of the A valves.

My invention is primarily concerned with controlling the oxygen concentration in accordance with the temperature of the gases which enter the reaction chambers during the regeneration step of this cycle. In a catalyst chamber about 15 feet in diameter and about 16 feet deep, the catalyst volume may be about 2000 to 2800 cubic feet. Through this catalyst about 2,000,000 to 3,000,000 cubic feet per hour of flue gas is recirculated with an inlet temperature within the approximate range of 500 to 800° F., preferably about 650° F. to 700° F. and an outlet temperature within the approximate range of 900 to 1100° F., preferably about 1000° F. Air is introduced into this recycled flue gas stream at the rate of about 120,000 to 200,000 cubic feet per hour. The space velocity through the catalyst bed is thus in the general vicinity of 1000 cubic feet per hour (measured at 60° F. and atmospheric pressure) of gas per volume of catalyst space. At the beginning of the regeneration only about 120,000 cubic feet per hour of air may be introduced and this may be gradually stepped up to about 200,000 cubic feet per hour. The oxygen concentration of the entering regeneration gases is thus generally maintained within the approximate range of about 1 to 2.0%.

With the above method of operation it has been found that the catalyst in certain parts of the reactor sometimes becomes overheated and sometimes the catalyst requires secondary burning. My invention provides a means of eliminating or at least minimizing overheating and eliminates or minimizes the necessity of secondary regeneration. In accordance with my invention a small sample of the recycled gas stream (which contains the added oxygen and which is about to enter the reactor) is withdrawn through conduit 61 in amounts controlled by valve 62 to a catalytic combustion chamber 65 which is heavily insulated by insulation material 66 and which contains vanadium oxide or other oxidation catalyst 67. Fuel gas from lines 56 and 63, or from any other source, may be heated in heat exchanger or heater 64 to approximately the temperature of the hottest part of the catalyst bed (i. e., about 1000 to 1050° F.) and then introduced into combustion chamber 65 along with the sample of regeneration gas. The heat generated by this combustion raises the temperature of the combustion gases to approximately the same level as the temperatures that would be produced in the catalyst bed. As the combustion gases leave chamber 65 through conduit 68 their temperature is measured by a thermocouple or other temperature measuring means 69 which is connected to a suitable indicator 70. If the temperature so indicated shows that the maximum temperature in the catalyst bed might be too high, valve 52 is gradually closed. If the indicated temperature shows that the maximum temperature in the bed will be considerably below the desired regeneration temperature, valve 52 is gradually opened. This gradual regulation of the oxygen concentration in the entering gases makes it possible to effectively prevent undue temperature rise in the catalyst bed and, at the same time, to employ as high an oxygen concentration as can safely be tolerated. I prefer to automatically control valve 52 in accordance with the temperature indicated by thermocouple 69; since such automatic control means per se are well known in the art they will require no detailed description.

Figure 2:
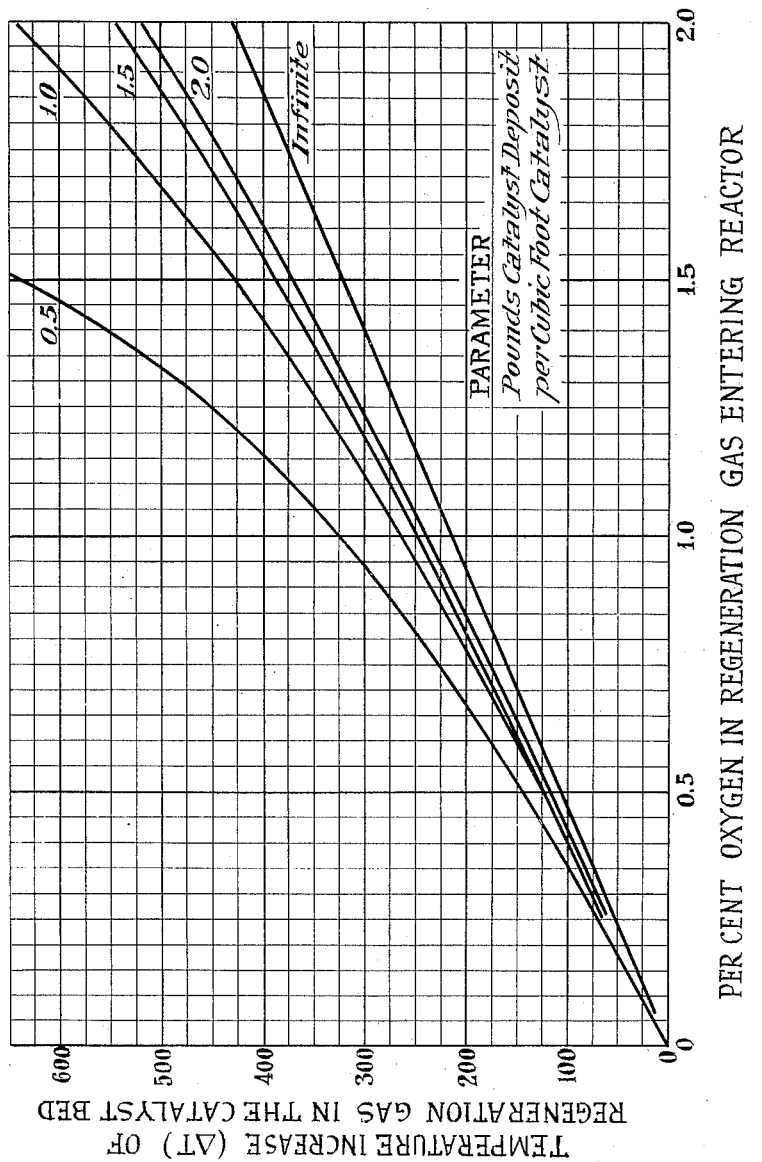
Figure 2 is a chart illustrating effect of oxygen concentration on temperature increase ($\Delta T$) with varying amounts of carbonaceous deposit on the catalyst in a specific installation.

In applying my invention to any given bed of contact material the system should first be "calibrated" on the basis of maximum catalyst temperatures indicated by thermocouples or other temperature responsive means which are placed at spaced intervals in the catalyst bed itself. In the particular example hereinabove described, the amount of oxygen in the entering regeneration gases that can be tolerated at various inlet regeneration gas temperatures and with various amounts of catalyst deposits are indicated in Figure 2 of the drawings. From this figure it will be seen that if the inlet regeneration gas temperature is 700° I may employ an oxygen concentration therein of about 1.4%. If the inlet regeneration gas temperature is about 800°, the oxygen content thereof should be only about 1%, assuming that 1.5 pounds of carbonaceous material is deposited on each cubic foot of catalyst material. In other words, the system is calibrated by determining the general order of magnitude of the oxygen concentration which can be safely tolerated as indicated by the thermocouples in the catalyst bed itself.

During this initial calibration my catalytic burner 65—70 may also be calibrated so that the reading or recording of indicator 70 will, in fact, show the temperature that will be obtained in the catalyst bed when the oxygen-containing regeneration gases reach said bed. With the system as a whole and the auxiliary burner thus calibrated, the indicator 70 may be followed for obtaining primary temperature control or valve 52 may be automatically regulated to maintain the desired temperature control. Since the activity of the combustion catalyst 67 may not always be exactly constant and since other variables may alter the original calibration, I do not rely entirely upon indicator 70 but also continue to constantly observe the actual temperatures in the catalyst bed as shown by the instruments connected with thermocouples which are spaced in said bed. If the bed temperatures ever get too high the necessary adjustment will of course be made in the calibration of indicator or recorder 70 or in the automatic control means leading to valve 52. On the other hand, if the catalyst bed thermocouples show that the temperature is within safe limits but indicator 70 shows that the oxygen concentration is too high for the safe regeneration of the particular catalyst in any particular state of regeneration, the oxygen concentration should be regulated in accordance with indicator 70 rather than in accordance with the temperature shown by thermocouples in the catalyst bed. My new combustion device may thus constitute a primary control which is kept within proper bounds by control means heretofore known in the art. On the other hand, since my new control means is auxiliary to control means heretofore employed, it may be considered as an auxiliary control which is subject to correction and calibration by primary control means. The function of my new auxiliary control system is to prevent overheating in the catalyst chamber while permitting maximum oxygen concentration at any particular regeneration gas inlet temperature. By the use of my invention the regeneration of spent contact material may be accomplished more expeditiously and safely than has heretofore been possible.

Instead of mounting the combustion chamber 65 outside of conduit 58 or 18 I may mount such combustion chamber in the flue gas recycle line as illustrated in Figure 3. Pressure or orifice controls in lines 63a and 68a will insure that a sufficient amount of fuel is introduced to utilize all of the oxygen in the gas sample which enters the combustion zone through screen 61a. As in the previous example, the thermocouple or other temperature responsive means 69 actuates a suitable indicator or recorder 70 and may automatically regulate the opening in valve 52.

My invention is not limited to the particular regeneration system hereinabove described nor to the particular means herein described for determining the maximum permissible oxygen concentration in accordance with the temperature of a given volume of inlet regeneration gas. Modifications, alternatives and equivalent operating means will be apparent to those skilled in the art from the above detailed description. An essential feature of my invention is the enrichment of the recycled flue gas in accordance with both the temperature of the flue gas and its oxygen concentration; for example, if the temperature of the gas in a specific instance is 600° F. the permissible oxygen concentration may be about 1.5% but if the temperature of this gas should fall to 500° F. or lower a much larger percentage of oxygen can be tolerated and should be used in order to maintain the combustion at a high temperature but to prevent the temperature from exceeding safe limits.

I claim:

1. In a system for regenerating a body of contact material that has become relatively inactive because of the deposition of carbonaceous material thereon, the method of obtaining temperature control which comprises continuously recycling regeneration gas through said body of contact material while venting a portion of the gases leaving the body of contact material and adding oxygen to that portion of the gases which enters the body of contact material, continuously cooling at least a part of the gases leaving the body of contact material to a temperature within the approximate range of 500 to 800° F., burning a hot fuel gas with a portion of the oxygen-containing recycled flue gas, determining the temperature increase effected by the burning step; regulating the amount of introduced oxygen in accordance with the temperature of the body of material undergoing regeneration in order to effect regeneration at a high temperature level which is below a predetermined maximum temperature and regulating the oxygen concentration in the recycled flue gas in accordance with the temperature increase effected by said hot fuel gas burning step whereby the desired maximum regeneration temperature in the body of contact material may be approached but not exceeded.

2. In a system for regenerating a body of contact material that has become relatively inactive because of carbonaceous deposits therein, the method of obtaining rapid and efficient regeneration without overheating said contact material which method comprises continuously recycling regeneration gas through said body of contact material while venting a portion of the gases leaving the body of contact material and adding oxygen to that portion of the gases which enters the body of contact material, continuously cooling at least a part of the recycled regeneration gas to a temperature below about 800° F., withdrawing a sample of the recycled gases to which oxygen has been added and passing said sample through a catalytic combustion zone together with an amount of hot fuel gas required for substantially complete combustion by the oxygen content of the withdrawn sample, burning said fuel gas with the oxygen in said sample by a combustion catalyst which is initially at approximately the temperature of that portion of the contact material which is undergoing regeneration, determining the temperature that is reached by the combustion of said fuel gas with the oxygen content of the sample, and regulating the amount of oxygen which is introduced into said recycled regeneration gas in accordance with said temperature.

3. In a system for regenerating a body of contact material that has become relatively inactive because of carbonaceous deposits therein, the method of obtaining rapid and effective regeneration without overheating, which method comprises continuously recycling regeneration gas through said body of contact material at a pressure in the general vicinity of 100 pounds per square inch and at a space velocity in the general vicinity of about 1000 volumes of gas, measured at 60° F. and atmospheric pressure, per hour per volume of catalyst bed, cooling to at least about 700° F. a part of the gases leaving said catalyst bed and venting a part of said gases from the system, adding to the cooled gases about .04 to .1 volume of air per volume of recycled cooled gas and controlling the amount of added air in accordance with the maximum temperature obtained by burning a portion of oxygen-containing recycled gas with a hot fuel gas.

4. The method of obtaining temperature control in a catalyst regeneration system which method comprises controlling the oxygen concentration in an entering regeneration gas stream in accordance with the temperature of catalyst which is undergoing regeneration and regulating the introduction of oxygen into the entering regeneration gas stream in accordance with the maximum temperature obtained by burning a portion of oxygen-containing gas from said gas stream with a hot fuel.

ROBERT C. GUNNESS.